United States Patent [19]

Schaub et al.

[11] Patent Number: 4,910,832
[45] Date of Patent: Mar. 27, 1990

[54] SPRING BAND CLAMP

[75] Inventors: Erwin L. Schaub, Manhasset; Frank J. Viola, Uniondale, both of N.Y.

[73] Assignee: Parker Hannifin Corporation, Cleveland, Ohio

[21] Appl. No.: 286,469

[22] Filed: Dec. 19, 1988

Related U.S. Application Data

[63] Continuation of Ser. No. 148,202, Jan. 29, 1988, abandoned, which is a continuation of Ser. No. 863,276, May 15, 1986, abandoned.

[51] Int. Cl.$^4$ .............................................. B65D 63/02
[52] U.S. Cl. .................................. 24/20 R; 24/20 TT; 24/20 S
[58] Field of Search ............. 24/16 R, 16 PB, 30.5 R, 24/30.5 P, 20 R, 20 EE, 20 TT, 20 S; 277/199

[56] References Cited

U.S. PATENT DOCUMENTS

| | | |
|---|---|---|
| 277,199 | 7/1986 | Buckley . |
| 1,705,895 | 3/1929 | Blair . |
| 3,130,462 | 4/1964 | Mitchell .............................. 24/16 PB |
| 3,224,054 | 12/1965 | Lige .................................... 24/16 PB |
| 3,256,577 | 6/1966 | Bright . |
| 3,324,234 | 6/1963 | Hervig . |
| 3,475,793 | 11/1969 | Oetiker . |
| 3,523,337 | 8/1970 | Oetiker . |
| 3,875,620 | 4/1975 | Wells et al. ........................ 24/16 PB |
| 3,930,287 | 1/1976 | Grise et al. ........................ 24/16 PB |
| 3,955,246 | 5/1976 | Tanaka ............................... 24/16 PB |
| 4,308,648 | 1/1982 | Fay . |
| 4,425,681 | 1/1984 | Ilius . |
| 4,478,437 | 10/1984 | Skinner . |
| 4,521,940 | 6/1985 | Oetiker . |

FOREIGN PATENT DOCUMENTS 1287485  2/1962  France ............................... 24/16 PB Primary Examiner—James R. Brittain
Attorney, Agent, or Firm—Renner, Otto, Boisselle & Sklar

[57] ABSTRACT

A clamping band for hoses and other cylindrical objects consists of a flat metal strap having a repetitive pattern configuration to provide desired amounts of elastic and plastic stretch capability and a pawl and tooth connection for adjustably joining the ends of the strap. In all embodiments the strap includes apertures evenly distributed throughout the circumference of the band to achieve desired stress/strain characteristics. In certain embodiments the apertures comprise circular punched holes and the strap may further include transverse or circumferentially extending slits to form the desired pattern, suitable for high volume manufacturing techniques.

11 Claims, 3 Drawing Sheets

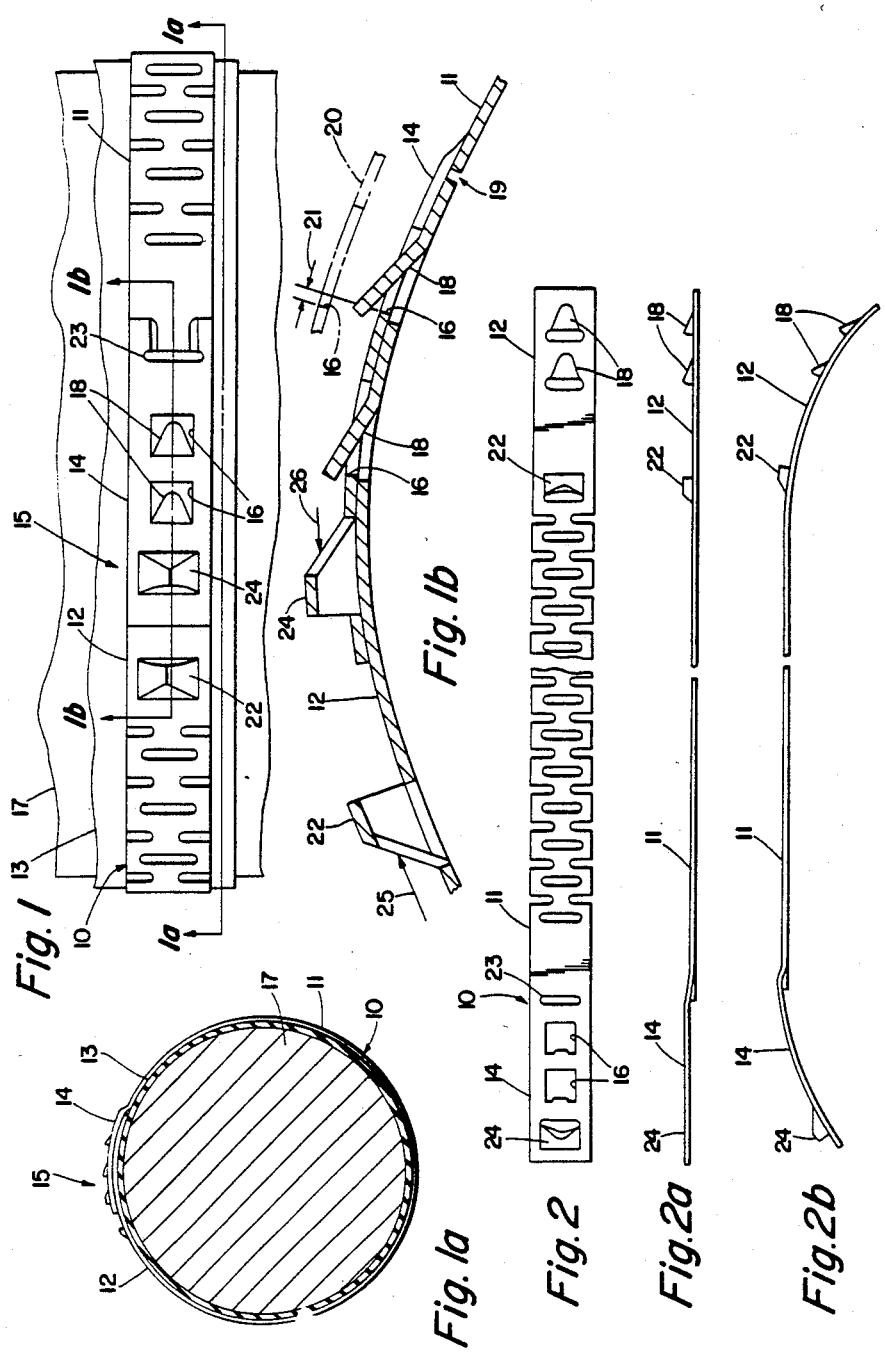

SPRING BAND CLAMP

This is a continuation of a file wrapper continuation of co-pending application Ser. No. 148,202 filed on Jan. 29, 1988, abandoned which was a continuation of Ser. No. 863,276 filed on May 15, 1986, abandoned.

BACKGROUND OF THE INVENTION

This invention relates to clamping bands for cylindrical objects and in particular to a metal band which is apertured to have an extremely high degree of stretch about its circumference.

Metal bands have been used for hose clamps and similar applications wherein it is desired to secure an elastomeric member to a rigid part or to apply compressive force to a resilient object for any number of applications. In certain of these applications, it is desired that the band be automatically readjusted or retightened during use to accommodate changed conditions and it is desirable to have a certain degree of spring in the band to automatically achieve this end.

For example, with respect to a metal clamp of this type for securing hose to a nipple or the like, it is desirable that the clamp accommodate pressure pulsations which occur in the fluid system without incurring permanent plastic deformation and yet retain the hose affixed to the nipple. Upon aging of the hose it is common for the elastomeric material of the hose to take a permanent set and it is desirable as well that the metal clamp continue to exert effective clamping force even though such altered dimensions and characteristics of the hose are encountered. Still further, it is desired that the hose clamp can be readily removed and repositioned upon the hose for service or maintenance purposes and that adjustable tensioning or dimensioning of the hose clamp be readily available. Still further, it is desired to have the clamp accommodate itself to the enlarging and shrinking of hoses and nipples which occur due to thermal expansion. This thermal expansion can be due to temperature changes in the fluid system or ambiant conditions.

Another application for a clamping band is to secure an elastomeric dust cover to a drive shaft or the like. This application is considerably different in that the underlying structure is relatively inelastic and any continuing clamping force must be derived substantially from the band clamp itself. It is further apparent, that if resilience in the combined structure is required in order to engage the ends of the clamp, such resilience must be provided substantially wholly by the clamp, and still retain its spring-like characteristics, once installed.

Several situations occur wherein it is desired to have a clamp which exhibits the characteristics of a permanent, plastic stretch and that of a temporary, elastic stretch. One situation is where there is no screw tightening means for the clamp but where it is tensioned using an external tool with the tension "locked" into the band by latching up a pawl or hook to a set of teeth or projections or the like. In such an application the elastic stretch would allow the retention of a known portion of the band load induced by the tool, after the slackening off that occurs when the pawl passes over the top of a tooth and comes to full engagement at the circumferentially displaced bottom of that same tooth.

In another application, previously described, wherein it is desired to place the clamp about an inelastic body and make use of the hook and tooth locking arrangement, it will become apparent that the teeth cannot be made small enough and still be structurally sound to allow an external tightening tool to bring a proper tension into the relatively rigid prior art clamping bands. In such application, there is insufficient stretch in the band to allow makeup with adjacent teeth and the item being clamped does not compress sufficiently to allow the pawl to reach the next tooth.

As noted, the elastic stretch capability in a band is particularly helpful in the application wherein the item being clamped expands or contracts, such as in a hose clamp. Here an elastic band follows the expansions and contractions of the object and maintains the seal without incurring permanent distortion.

A number of clamps are already known which utilize the advantage of including some degree of resilience for certain of the reasons enumerated above. One such example is shown in U.S. Pat. Nos. 3,475,793 and 3,523,337. Here the band includes a plurality of tensional spring elements in the form of ear-shaped folds which are distributed over the circumference of the band. A pawl and tooth type band closing mechanism is employed permitting a step-like fitting of the band to an object to be clamped. This type of clamp is limited in requiring substantial radial space to accommodate the spring portions of the band and requires a relatively complicated forming operation during manufacture whereby bending of the metal strip must be performed in a plurality of locations. It is also limited to low tension loads and high spring rates (i.e. high values of inches per pound inch).

A similar form of hose clamp is described in U.S. Pat. No. 4,308,648 wherein a series of convolutions of the metal strip are provided at one location in the circumference of the band to provide a desired amount of resilience to the band. This arrangement is subject as well to the radial space limitation and requires effecting multiple bends in the strap during manufacture. This clamp also discloses an inner shield beneath the convoluted area to prevent extrusion of the elastomeric material of the hose into the convolutions which would affect the resilience of the clamp. Such device is a separate component in the embodiments described and requires some form of attachment to the remainder of the clamp.

Another form of prior art hose clamp is shown in U.S. Pat. No. 1,705,895 wherein a metal band is shaped in at least one portion thereof in a dual zigzag pattern and provided with a hook and ratchet tooth type fastener for closing the ends of the clamp. The zigzag portion is utilized to provide resilience or springiness to the clamp to accommodate the compression set of underlying hose structures and the like and is described as bending slightly under tension to provide the springiness. It is this type of hose clamp with which the instant invention is concerned whereby improved results and manufacturing efficiencies are to be achieved. The hose clamp shown in this patent teaches primarily that the resilience is provided to account for compression set in the hose and shows a localized treatment of the subject at one or two locations about the circumference. Further, the sharp zigzag configuration is not well suited for large elastic excursions without incurring plastic deformation and is not an efficient utilization of the metal material.

Still another form of clamp or connector strap is shown in U.S. Pat. No. 3,324,234, this being a metal strip which is punched or otherwise shaped to provide a configuration throughout the circumference of the strap of a series of transversely extending spring arms. Each arm terminates in radially inwardly bent legs which are adapted to engage the object to be clamped. When the center portion of the strap is drawn taut for securement, the spring arms are depressed at the center to provide a resilient force. The center portion of the strap includes a plurality of transversely extending slots in each spring arm to receive the connecting tab. This form of strap is designed primarily for engagement with substantially rigid objects and to provide both a mechanical and an electrical connection therewith.

SUMMARY OF THE INVENTION

The instant invention is concerned with improved forms of flat-band connector straps which provide a relatively high degree of resilience and which are suitable for applications in many different environments. The key to this invention is to provide much more resilience in a band strap than was known to be feasible previously and which is achieved in several different configurations. What has been discovered is that a high degree of stretch can be designed into a band and controlled as a function of the configuration of the band and that both elastic and plastic stretch of the band can be manipulated to achieve certain desired characteristics. Such band clamps are particularly suited as hose clamps wherein pressure pulsations, thermal expansions (contractions), and compression set characteristics must be accommodated. But the clamps are suited as well for securing substantially rigid objects where it is desired to utilize the tension in the band to retain the clamp and to perform the joining function when the band ends are locked together.

The clamp of the invention comprises a thin, flat, elongated sheet of material, preferably metal such as stainless steel or the like, which may be formed into a circle to surround an object to be clamped and which is secured at its ends in any of several conventional manners. The metal sheet is formed in a particular manner throughout its circumference to provide a plurality of distributed bending sections which deform slightly under tension and return to their original shape to provide resilience or springiness to the band. The pattern of the metal sheet may differ for varying applications but essentially will comprise a plurality of repetitive shapes each of which therefore contributes substantially equally to the overall band resilience. It had been determined that the end to end, reversed c-shape and nested c-shape configurations provide a high degree of elasticity and are particularly suited for hose clamp applications and the like, where an elastomeric member is to be secured. Another configuration is a beam, c-frame design which is essentially a plurality of face to face c-shaped sections distributed along the lengths of the band, interspersed by beam sections. This configuration provides a relatively low level of stretch, but is sturdy and finds particular application in the clamping of rigid objects.

Various other shapes are possible and provide different degrees of stretch of both a plastic and elastic nature and the degree of either of these parameters may be controlled to a certain extent as required. For example, it is desired to distribute the strain of a clamp through its circumference as evenly as possible so as to obtain the greatest degree of stretch without encountering plastic deformation and equal stress designs have been configured for this purpose. Essentially these may comprise smoothly undulating c-shapes which avoid sharp turns and distribute the applied stress fairly equally. This may be achieved in the nested c-shape design or the face to face c-shape design, previously noted, and in front to back c-shape configurations or other designs as suitable.

An essential design criteria is that the clamp design be readily manufactured in a high speed, mass production environment and for this reason it is desired that simple shapes, as achieved by punching or straight line slitting be used where possible so that a continuous band may be passed through appropriate equipment at a high rate of speed and be formed and cut to length consistently and economically.

In all of the embodiments of the instant invention the band is an elongated strip of material having a repetitive pattern therein and designed for stretchability substantially in the circumference of the band and not by radial inner or outer deformation. In such arrangement, an extremely small radial dimension is occupied by the band lending itself to many applications where space is at a premium. Also minimal affect is thereby placed upon the object being clamped and in the instance of elastomeric material such as rubber hose and the like, such variable factors as aging, material deviation, compression set and the like, do not mechanically affect the resilient performance of the clamp.

A suitable closure for the strap is the hook and tooth device whereby the band may be stretched to a certain degree to reach a particular tooth and then allowed to relax to set the hook at the tooth and yet retain a large degree of resilience in the band. In some instances by designing permanent plastic stretch into the band the hook may be moved to adjacent teeth to achieve lockup and still retain substantially the same degree of resilience. Other forms of closures may be used as well which have been employed in the past. The advantage of the hook and tooth arrangement however, is the ease of manufacture, minimal material requirement, the steplike adjustment particularly suited to this invention and the absence of a requirement for adding a further component as by welding or the like, to the essential strap configuration.

BRIEF DESCRIPTION OF THE DRAWINGS

FIG. 1 is a plan view of one embodiment of spring band clamp of the invention in secured engagement with a shaft having an elastomeric dust cover thereon;

FIG. 1a is a sectional view taken along the lines 1a—1a of FIG. 1, showing the spring band clamp in end view;

FIG. 1b is a sectional view of a part of the spring band clamp taken along the lines 1b—1b of FIG. 1;

FIG. 2 is a plan view of the spring band clamp of FIG. 1 shown in open, laid-flat configuration, in one stage of its manufacture;

FIG. 2a is an end view of the spring band clamp of FIG. 2;

FIG. 2b is an end view of the spring band clamp of FIG. 2 in a further stage of its manufacture;

DETAILED DESCRIPTION OF THE INVENTION

Figure 3:
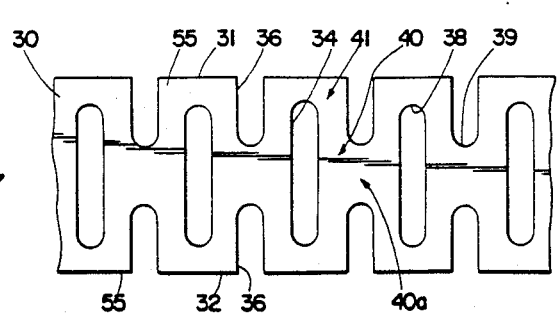
FIGS. 3–8 are plan views of six embodiments, respectively, of the invention, in each view showing a portion of the band in a laid flat configuration.

Referring now to the drawings, a typical embodiment of the invention is shown in FIGS. 1 and 2 as a spring band clamp 10 consisting of elongated metal strap or band 11, having ends 12, 14 and including closure device 15 at the respective ends 12, 14. Strap 11 is preferably metal and typically stainless steel although many other materials would suffice as will be pointed out in greater detail hereafter. Strap 11 is formed into a circular or similar configuration for a typical application as a hose or shaft clamp or the like, so that ends 12, 14 are overlapping and adjacent one another and adapted to be secured when strap 11 is placed about an object to be clamped. End 14 is raised from the surface of strap 11 by deforming the latter at aperture 23 so that end 14 can overlie end 12 in close adjacency.

In the view of FIG. 1, strap 11 is secured over a tubular portion of an elastomeric boot 13, in turn covering a cylindrical shaft 17 which may be part of a constant velocity joint of a vehicle transmission, or the like. In this example, boot 13 is relatively thin and may be on the order of the radial thickness of strap 11. In other examples, strap 11 may be placed in a similar manner about cylindrical objects such as fluid-bearing hose or tubing in which the elastomeric body being clamped to a solid member therebeneath is substantially greater in radial thickness.

Closure device 15, as seen more clearly in FIG. 1b comprises a pair of hooks 16 and a corresponding pair of teeth 18 formed in the ends 12, 14 of strap 11. Hooks 16 are substantially square apertures circumferentially spaced along the length of strap 11 and formed by a punching operation, or the like. Teeth 18 are also circumferentially spaced in end 12 and are formed by punching or otherwise deforming strap 11 radially outwardly in a projection of generally triangular, arcuate configuration providing a raised lip from the plane of strap 11. In FIG. 1b it may be clearly seen that typically hook 16 must be drawn circumferentially further over a respective tooth 18 in order to clear the tooth (as shown in phantom lines 20), before the hook can be moved radially inwardly and relaxed to assume its locked position which is shown in solid lines. The quantity of movement of hook 20 to achieve this closure position is depicted by the space between arrows 21 and will vary depending upon the shapes of the hook and teeth. In order to avoid overstretching at installation, the size of the gap 19 between the band end 12 and the unraised portion of strap 11 is controlled so that dimension 21 has a limitation. Overstretching would be damaging to the clamp. However, such spacing indicates that a degree of resilience must be provided either in strap 11 itself or in the object to be clamped to accommodate such movement and still provide a tensioned clamp effect upon the object. Also included in ends 12, 14 of strap 11 are closure pawls 22, 24 which also are punched projections of strap 11 adapted to be engaged by a plier-type tool (not shown) to draw the ends 12, 14 of strap 11 together in the directions depicted by arrows 25, 26 for the purpose of closing the clamp 10 as described, or of opening same for release of hook 16.

While the hook 16 and tooth 18 form of closure device 15 is depicted, it is clear that many other forms of closure device will perform in a similar manner and be suitable for retaining the ends 12, 14 of strap 11 in a relatively fixed relationship. Thus, end 14 might have a single formed hook thereon (not shown) which could be placed over teeth 18 in various degrees of overlapping engagement of the ends and a somewhat similar opening and closing over-tensioning might be required to allow movement of the formed hook over the teeth 18. But other forms of closure devices 15 could serve as well to retain the ends 12, 14 and apply a tension to the strap 11, including, for example, a worm drive screw. Similarly, it is apparent that as few as one hook 16 and tooth 18 combination could be employed, or that multiple teeth 18 could be used to provide varying amounts of overlap of ends 12, 14 and an adjustment for the circumferential extent of strap 11. Placement of pawl 24 outwardly of hooks 16 provides the additional advantage that the tensioning tool applied thereto tends to move hooks 16 radially inward onto teeth 18, facilitating the snap engagement therebetween.

Raised end 14 is seen clearly in the edge view of FIG. 2a. In FIG. 2b a further deformation of strap 11 is made to encourage proper proportioning and retention of strap 11 on an object to be clamped. Thus, both ends 12 and 14 are prebent into a partly circular configuration, of a diameter substantially that of shaft 17 of FIG. 1a so that where applied, ends 12, 14 will closely conform and tend to retain their concentric relation. This helps to assure a relatively low, smooth profile for the installed strap 11 and facilitates also the proper interengagement of hooks 16 and teeth 18.

The first embodiment of the invention is depicted in part in the enlarged view of FIG. 3 as comprising an elongated strap 30 of thin, flat sheet metal which extends substantially the full distance between ends 12, 14 depicted in FIGS. 1 and 2. Strap 30 is shown in plan view, in longitudinally flat condition, but which is substantially the same configuration as the strap 30 would assume when banded about an object to be clamped as shown in FIG. 1. Strap 30 is formed from a sheet metal strip having transverse edges 31, 32 and is apertured by any appropriate process to produce the configuration shown. In this configuration strap 30 includes a plurality of equally circumferentially spaced, transversely extending slots 34, centrally located between edges 31, 32.

Longitudinally centrally disposed between adjacent slots 34 are a pair of apertures 36 which are cut into edges 31, 32 and which extend transversely from the edges toward one another and toward the center of strap 30. Ends 38 of slots 34 and ends 39 of apertures 36 are smoothly rounded and may be circular for ease of manufacture or to avoid stress concentrations. The material along each side of slots 34 constitute a beam section 40 while that remaining material of strap 31 surrounding the ends of slots 34 constitute c-shaped sections 41. The beam sections are connected by tension links 40a. Thus, the strap 30 comprises alternate beam 40 and c-shaped sections 41 that are connected by links 40a throughout the length or the circumference of clamp 10 between ends 12, 14. The dimensions of slots 34 and apertures 36 and the spacing of same is such that substantially the same width of material forms the beam 40 and c-shaped sections 41 on either side of the longitudinal center of strap 30.

It will be apparent that such dimensioning serves a useful purpose. Since overall tensioning of strap 30 is nothing more than an accumulation of the resilient deflection of a plurality of sections of strap 30, each section comprising a beam 40 and c-shaped section 41, it is desired to achieve a substantially uniform deflection or strain throughout the length of the strap so as not to overstrain any one particular location.

The design in this embodiment of the invention is a simplified approach to achieving such uniform strain characteristics in a readily manufactured configuration since only basic shapes of simply radiussed punches may be employed. Typically the material of clamp 10 is stainless steel which is relatively hard and of limited ductility and which pressents some design constraints for high volume production. While the dimensions of clamps 10 will vary considerably for the desired application, a typical band width between edges 31, 32 would be on the order of 0.5 inch and the thickness of the strap 11 material on the order of 0.025 inch. The overall length of clamp 10 from end 12 to end 14 might be on the order of 6 or 18 or so inches so that it is apparent in the usual configurations that the width will be on the order of several times the thickness, while the length is several times the width. In a clamp 10 of the dimensions described the applied tension could be on the order of about 150 pounds and the overall possible elongation of the clamp on the order of 0.30 inch. It is apparent then, that such results will affect, for example, the spacing of teeth 18, so that the clamp might be stretched sufficiently to reach from one tooth to another and still be within an elastic range of the strap 11. While tooth spacing can be adjusted to some extent, it is desirable in some embodiments to have the spacing as close as feasible and yet not reach the design constraints where the radial projection of the tooth 18 is too small or the overall dimensions so limited as to introduce significant weakness into the clamp 10 at this location. In fact, this is a severe design constraint as a minimal spacing dimension is usually required and it is extremely difficult to provide sufficient elasticity in the strap 11 to obtain the desired stretch characteristics.

Figure 4:
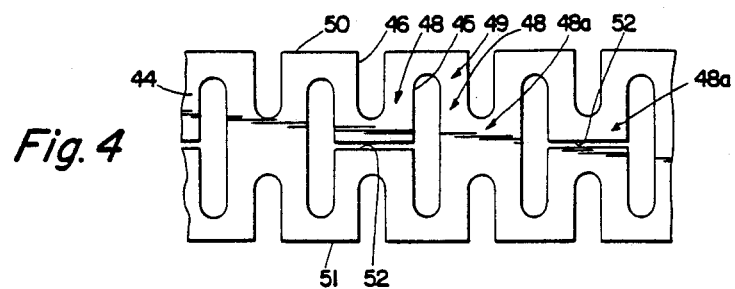

With reference to the second embodiment of the invention depicted in FIG. 4, a very similar strap 44 is shown as that strap 30 in FIG. 3. Thus, strap 44 includes similar slots 45, apertures 46, beam sections 48, link sections 48a and c-shaped sections 49, located between edges 50, 51. Upon testing of such basic configuration it has been determined that the link sections 48a were the least resilient portions of the structure in that end-wise applied loads introduced a direct stretching of such section but little bending moment therein. One approach to modifying such characteristic is to include longitudinally extending slots 52 in alternate link sections 48a. The width of slots 52 could be on the order of a few thousandths of an inch and typically might be achieved by a simple slitting operation. The effect of slots 52 is to convert certain beam and link sections 48 into sections similar to c-shaped sections 41. These new internal c-shaped sections now will introduce additional bending movement and strain and thereby increase the resiliency of strap 44. While slots 52 are depicted in alternate link sections 48a, it is apparent that groups of two, three or four or so link section 48a could be so slotted to enhance the desired intermediate result. The intent of the slitting and all subsequent refinements in the shape of the elements is to force all available material to distort elastically (i.e. accept strain) and contribute to the stretch.

Figure 5:
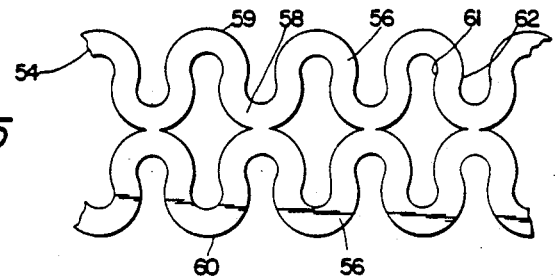

Referring to a third embodiment of the invention as seen in FIG. 5, this now is a further extension of those designs of FIGS. 3 and 4. Here strap 54 has been further modified to achieve an even more equal stress distribution throughout the strap 54. The c-shaped sections 41 of FIG. 3 have been modified to eliminate the corners 55 which were contained very low stresses and thus contributed little to the desirable strain. Elimination of corners 55 results in improving the elastic energy content of the material of the strap 54 by helping to distribute the stress more evenly therethrough. Thus the basic configuration of strap 54 is again that of face to face c-shaped sections 56 distributed along the length of strap 54.

Similarly, slots 34, and apertures 36 of FIG. 3 have been modified in the embodiment of FIG. 5 by smoothly rounding same and continuously providing altered widths so that all portions of the c-shaped frames are as equally stressed as possible under the action of the tension in the band. The inner c-shaped sections may remain joined at the center of strap 54 midway between edges 59, 60, now the outermost dimension of the outer c-shaped sections 56, or may be longitudinally apertured to provide slots similar to slots 52 of FIG. 4, for further control of the resilience of strap 54. Tests upon strap 54 of this embodiment provide even greater strain throughout clamp 10 before permanent plastic deformation occurs, resulting in a greater possible range of elasticity. Additionally, the configuration of FIG. 4 and FIG. 5 provide larger plastic stretch prior to failure. This is a valuable feature when it is necessary to accommodate a large variation in initial outside diameter.

Figure 8:
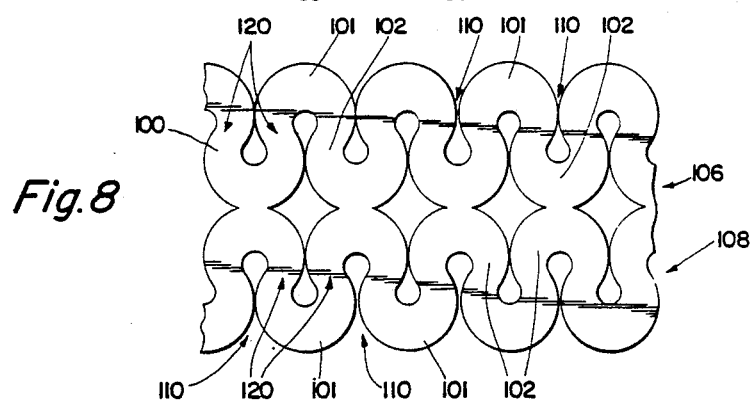

Another refinement in getting greater strain and therefor greater elastic energy storage is to conserve the available material. Rather than punch out the apertures and slots shown in FIG. 5, the configuration can be compressed longitudinally into a shape shown in FIG. 8. For any given length of band—the most material must be retained—and that which is retained should be shaped to accept uniform stress. In this embodiment of FIG. 8, strap 100 comprises end to end connected, alternate c-shaped sections 101, 102 in a dual row 106, 108 configuration similar to that of FIG. 5. Sections 102 may be connected back to back as shown or separated in various manners as previously described to attain various control over the resilient parameters of the strap. As noted, the legs of adjacent sections 101 are arranged to provide only a small space 110 therebetween, while the sections 102 are similarly configured in this highly efficient, even stress distribution design. Also, it is noted that at the interface of sections 101, 102 as at 120, the width of strap 100 is narrowed since only shear stresses are carried here.

Figures 6, 7, 9:
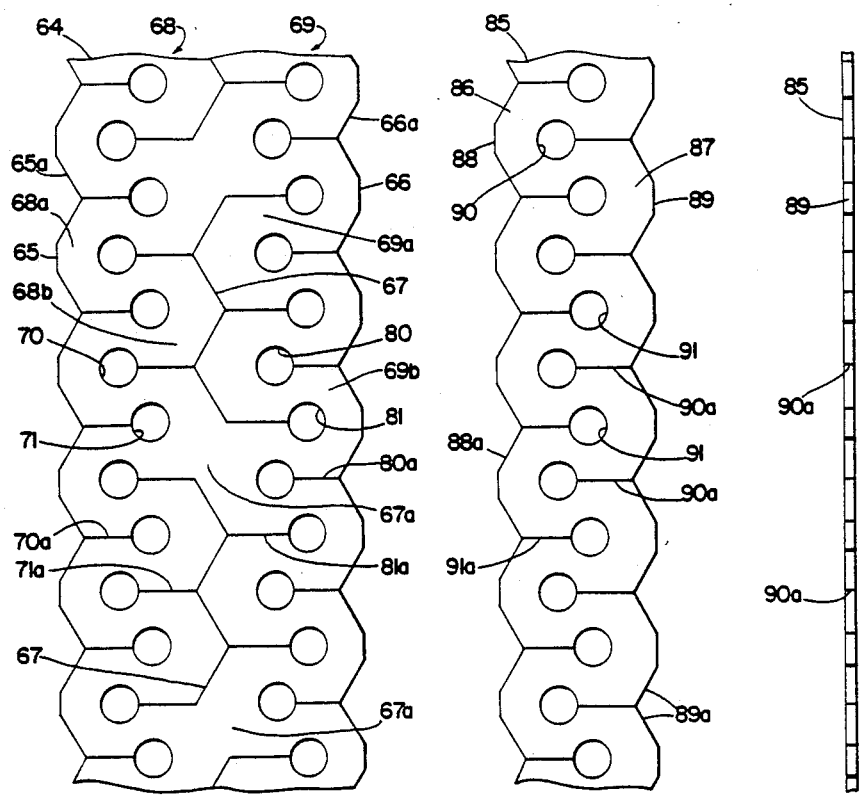
FIG. 9 is a side view of the band shown in FIG. 7.

Another embodiment of the invention is depicted in FIG. 6 in which strap 64 is shaped in a "nested-c" design in a double pattern arrangement. Referring again to FIG. 5 it is noted that while a good stress distribution characteristic is obtained, a relatively inefficient utilization of material is made. Further, difficult to make shapes have been encountered in the formation of the slots 61 and apertures 62 therein, resulting in inefficient manufacturing procedures. For mass production techniques it is desired to produce the slots and apertures as efficiently as possible and to utilize the maximum amount of material for a given strap length, so as to reduce the width and/or thickness of material required. The former result is achieved by machining the strap 64 with simple punched holes and slitting techniques while the latter is realized in the nested-c design.

In this design of FIG. 6, strap 64 having edges 65, 66 includes side by side rows 68, 69 of elemental c-shaped elements 68a, 68b and 69a, 69b. Elements 68a, 68b are formed by two adjacent rows of longitudinally aligned, equally spaced holes 70, 71, with transverse slits 70a, 71a respectively, extending toward the outer edge 65 and a central zigzag slit 67, extending the length of strap 64. The zigzag slit is interrupted every three, four, or five pitches to maintain connection between the side-by-side rows. Elements 69a, 69b are similarly formed by holes 80, 81 and transverse slits 80a, 81a. The outer sides of the elements at the edges 65, 66 are formed in a similar manner by straight line cuts resulting in angular margins 65a, 66a which respectively intersect transverse slits 70a, 80a. C-shaped sections 68a, 68b meet in an end to end configuration through the length of strap 64 as does the parallel row of c-shaped sections 69a, 69b. Sections 68a, 69a open, as determined by slits 71a, 80a respectively, in the direction toward one edge 66 while sections 68b, 69b open toward edge 65 while all of the sections share common, central zigzag slits 67. Zigzag slits 67 are discontinuous or interrupted by solid sections 67a to provide integrity to the overall structure. Sections 68b are nested in the opening slits 81a of sections 69b in a front to back design, while sections 69a are nested in the opening slits 71a of sections 68a in a similar front to back design. Thus, it may be seen that an optimum utilization of material has been achieved with this design while accomplishing a great degree of resilience similar to that obtained in other embodiments of the invention.

A still further embodiment of the invention is disclosed in FIGS. 7 and 9 comprising plan and side views of a further metal strap 85. Again, the basic c-shape design is employed, here however, with a single row of c-shaped elements 86, 87 connected end to end, being alternately reversed and extending the length of strap 85 and the full width thereof between edges 88, 89. Sections 86 are formed by equally longitudinally spaced, aligned holes 90 and sections 87 by evenly spaced intermediate holes 91 in an adjacent row. Transverse slits 90a, 91a and angled margins 88a, 89a, similar to that of FIG. 6, complete the configuration of strap 85. Elements 86 open via slits 90a toward edge 89 while elements 87 open via slits 91a toward edge 88. Holes 90, 91 are produced by a simple punching technique while all slitting is performed in a straight-line manner to achieve the desired configuration.

Figure 10:
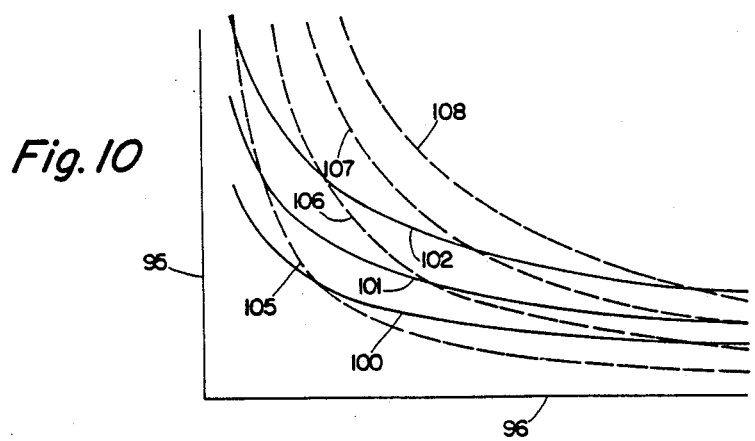
FIG. 10 is a graph of test results for various band clamp samples, plotting applied tension in pounds versus spring rate in inches per pound-inch.

Referring now to FIG. 10 there is shown a graph of the characteristics of the various embodiments of the invention. Plotted as the ordinate 95 is the tension load in pounds applied to any of the clamps described. Plotted as the abscissa 96 is a factor characteristic of the spring constant per inch for any of the bands and defined as $K = 1/P \times D/L \times 10^{-6}$ inches per pound-inch, where P is the tension load in pounds, L is the length of a clamp under test and D is the deflection or strain of the band in inches. Curves 100, 101, 102 are lines of equal energy respectively descriptive of 3, 6 and 12 inch-pounds at the indicated scale factor. Curves 105, 106, 107, 108 are lines descriptive of actual samples of the various embodiments of the invention and respectively representative of the values 0.01, 0.02, 0.03 and 0.04 which are ratios of deflection or strain of the clamp divided by the length of the clamp.

Thus, for example, the strap 30 of the FIG. 3 embodiment of the invention might have the relatively stiff characteristic of curve 105 while the strap 54 of the FIG. 5 embodiment might be represented by the curve 107. The curves 100–102 provide a comparison useful to determine when the efficiency of a particular element design relative to the volume of material used.

We claim:

1. A metal clamp for securing hoses and like objects, comprising an elongated flat strip adapted to lie flat in substantially full engagement with an object to be clamped, said strip being punched from sheet metal material, having first and second ends, and being defined in transverse dimension by first and second edges in the plane of said strip, means for joining said first and second ends and said strip about an object in tensioned relation with said first and second edges in engagement with said object, a plurality of transversely extending slots in said strip distributed substantially throughout the length of said strip, said slots having slot ends spaced transversely inwardly of said strip edges, and a plurality of transversely extending apertures in said strip interspersed between adjacent slots, said apertures extending inwardly from said strip edges and having aperture ends more inwardly spaced from said strip edges than adjacent ones of said slot ends, and said apertures being formed open to said strip edges when said strip is punched from sheet metal material.

2. The clamp as set forth in claim 1 wherein said slots and apertures are defined by transversely extending straight line segments.

3. The clamp as set forth in claim 1 wherein the ends of said slots and the inner ends of said apertures are circular.

4. The clamp as set forth in claim 1 wherein said strip includes beam sections, formed between transversely strip includes beam sections, formed between transversely overlapping portions of adjacent slots and apertures, and C-shape sections, extending around the ends of said slots to interconnect adjacent beam sections; and said beam sections and C-shape sections are substantially the same width.

5. The clamp as set forth in claim 4 wherein said strip includes link sections interconnecting inner ends of adjacent beam sections, said link sections being disposed along the longitudinal center line of said strip and having a width greater than said beam and C-shape sections.

6. A metal clamp for securing hoses and the like, comprising an elongated flat strip adapted to lie flat in substantially full engagement with said hose and the like, having first and second ends, and being defined in transverse dimension by first and second edges in the plane of said strip, means for joining said first and second ends and said strip about an object in tensioned relation, a plurality of transversely extending slots in said strip distributed substantially evenly throughout the length of said strip, said slots having slot ends spaced transversely inwardly of said strip edges, a plurality of transversely extending apertures in said strip interspersed between adjacent slots, said apertures extending inwardly from said edges and having aperture ends more inwardly spaced from said edges than adjacent ones of said slot ends, and longitudinally extending slots in said strip between said transverse apertures and interconnecting less than all of said transverse slots.

7. The clamp as set forth in claim 6 wherein said longitudinal slots are disposed between every other one of said transverse slots.

8. A metal clamp for securing hoses and the like comprising an elongated flat strip having first and second ends, and defined by first and second transversely spaced edges, means for joining said first and second ends and said strip about said hose and the like in tensioned relation, four rows of circular holes evenly distributed longitudinally throughout the length of said strip between said ends, said rows of holes being transversely spaced, said holes of any one row being longitudinally spaced between adjacent pairs of said holes in an adjacent row, a zigzag slit in said strip between said second and said third rows of holes, transverse slits in said strip joining said holes of said first and fourth rows of holes with said zigzag slit, and transverse slits in said strip extending from said holes in said second and third rows of holes outwardly toward and intersecting with said edges.

9. The clamp as set forth in claim 8 wherein said first and second edges of said strip comprise angled edges and said transverse slits intersect said edge at the junction of adjacent pairs of said angled edges.

10. The clamp as set forth in claim 8 wherein said strip is stainless steel.

11. A metal band clamp comprising an elongated flat strip having opposite ends and means for joining said opposite ends and said strip about an object in tensioned relation, said strip having parallel side edges in the plane of said strip whereby said strip may lie flat in substantially full engagement with said object, a plurality of transversely extending slots distributed substantially evenly throughout the length of said strip, said slots having slot ends spaced transversely inwardly of said strip edges, and two rows of transversely extending apertures interspersed between adjacent slots, said apertures in each said row extending inwardly from a respective one of said side edges and transversely overlapping end portions of adjacent slots to form a row of longitudinally spaced apart beam portions of said strip, said beam portions in said row thereof being substantially parallel with one another substantially evenly throughout the length of said strip when said strip is in an original untensioned condition.

* * * * *

UNITED STATES PATENT AND TRADEMARK OFFICE
CERTIFICATE OF CORRECTION

PATENT NO. : 4,910,832

DATED : March 27, 1990

INVENTOR(S) : Erwin W. Schaub, et al.

It is certified that error appears in the above-identified patent and that said Letters Patent is hereby corrected as shown below:

Column 10:

Claim 4, lines 2 and 3, delete "formed between transversely strip includes beam sections,".

Signed and Sealed this

Twenty-ninth Day of September, 1992

Attest:

DOUGLAS B. COMER

Attesting Officer

Acting Commissioner of Patents and Trademarks